July 28, 1936.　　　J. F. PUTNAM　　　2,048,949

VOLUME MEASURING DEVICE

Filed June 18, 1934

Inventor
Joseph F. Putnam
By: *[signature]*
Attorney

Patented July 28, 1936

2,048,949

UNITED STATES PATENT OFFICE 2,048,949

VOLUME MEASURING DEVICE

Joseph F. Putnam, Berkeley, Calif., assignor to Standard Oil Company of California, San Francisco, Calif., a corporation of Delaware Application June 18, 1934, Serial No. 731,057

3 Claims. (Cl. 73—166)

This invention relates to a measuring device and more particularly to a measuring device of the type adapted to indicate the correct volume of a liquid as related to mass.

The volume of most liquids is not an accurate measurement of mass, as it is known that liquid volumes vary with changes in temperature. In the case of dispensing gasoline to the ultimate consumer, the volume method is generally used, and no correction is made, taking into account the density of the liquid at the time it is measured.

A popular type of equipment used in dispensing gasoline by the volume method consists of a transparent container, into which the gasoline to be dispensed is pumped. This container is graduated with markers to indicate the volume of the gasoline in gallons. These markers are in fixed relation with the container and will dispense a given mass of a particular gasoline at a specified temperature.

For ordinary ranges of temperature, it may be assumed that gasoline expands or contracts .0006 of its volume for each degree of temperature change. For example, 10,000 gallons of gasoline at 60° F., would have a volume of 9,994 gallons at 59° F., or 10,006 gallons at 61° F. In other words, for each 17° change in temperature above or below 60° F., the volume would be changed about 1%.

It is one object of this invention to provide a measuring device that shall indicate the correct volume of a liquid as related to mass.

Another object is to provide a measuring device that shall be responsive to the density of a liquid being measured, to automatically indicate the correct volume of such liquid as related to mass.

Another object is to provide a measuring device that shall indicate the correct volume of a liquid as related to mass, without resorting to additional weighing means.

Another object is to provide a measuring device having the above characteristics that shall be controlled by the density of the liquid being measured.

Another object is to provide a density controlled variable graduating means in combination with a liquid container having a transparent element, the graduating means being located inside the container so that it is directly influenced by the density of the liquid being measured.

Another object is to provide a measuring device that shall be responsive to the density of a liquid being measured to indicate the correct volume of such liquid as related to mass, which device will operate correctly whether the density of the liquid is inherent or varied due to changes in temperature.

A still further object is to provide a density controlled variable graduating means that shall be adaptable for use with, and that can be readily and easily installed in transparent containers now in use for dispensing liquids.

A still further object is to provide a device having the above characteristics that shall be simple in structure, durable, positive and accurate in operation and comparatively cheap to manufacture.

The accomplishment of the above and other objects of the invention will be apparent to those skilled in the art when taken in connection with the accompanying drawing, wherein like reference characters refer to like parts. It is to be expressly understood that the drawings are not a definition of the invention, but merely illustrate a form by means of which the invention may be effectuated.

Figure 1:
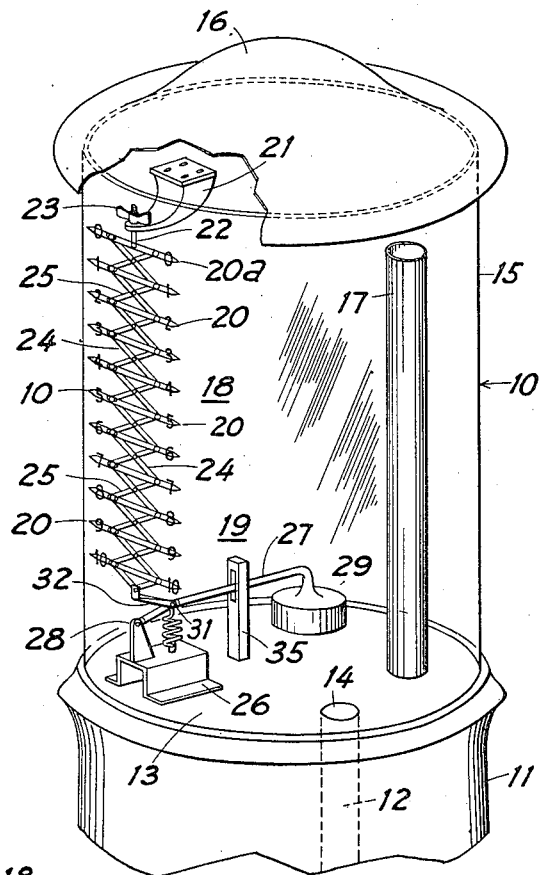
Figure 1 is a perspective view of the device embodying the invention.
Figure 2:
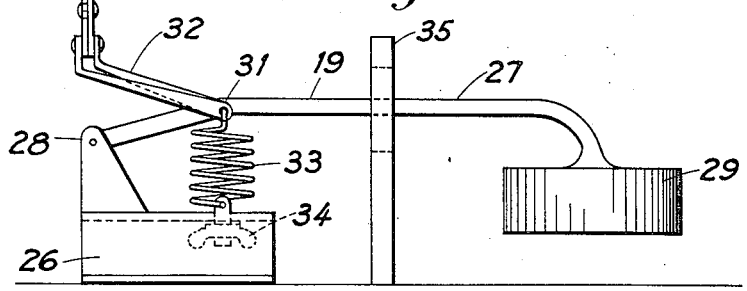
Figure 2 is an enlarged detailed view of the density responsive unit.

In the form shown there is provided a popular type of liquid dispenser which comprises a container 10 mounted on a suitable supporting base 11. A conventional drain or dispensing conduit 12 is operably connected with the interior of the container through the container bottom 13 as shown at 14. The body 15 of the container 10 is transparent and usually cylindrical in shape. The container body 15 is closed at its lower end by the bottom 13 and at its upper end by top 16. An overflow pipe 17 is provided in the container to limit the level that liquid may rise within the container.

A suitable indicating means or variable scale, represented in its entirety by 18 is vertically mounted adjacent the side wall of the container 10, and is operably connected to a density responsive unit, represented in its entirety by 19.

The variable scale 18 may be of any suitable type, and for the purpose of disclosing the invention, the variable scale here employed is of the type known as a pantograph, the latter being adapted to support a plurality of spaced indicating parts 20, the uppermost one of which is fixed or stationary relative to the container while the others are adjustable or variable with reference to the fixed indicator and to each other. The stationary indicator 20a is located at the point or level in the container determined by the overflow or drainpipe 17. The ends of the indicators 20 may terminate in the form of an arrow, and each of the indicators may be curved to coincide with the curvature of the container body, thereby permitting the positioning of the indicators close to the wall of the container, whereby a correct reading may be made.

The upper indicator 20a is supported from the top 16 by means of a curved or arcuate shaped member 21. The lower end of the member 21 is adapted to receive a connecting link 22, the latter being fixed at its lower end to the indicator 20a, and provided at its upper end with a threaded means 23, whereby the indicator 20a may be adjusted to lie in the same plane as the top of the drain pipe 17. Each of the indicators 20 may be carried by the cooperating ends of the respective cross levers 24 and 25, the cooperating cross levers 24 and 25 being pivotally connected at their points of intersection, and the cooperating ends of the cross levers being pivotally connected with the ends of the respective adjacent cross lever forming a pantograph of the conventional type.

The density responsive unit 19 comprises a base 26, mounted within the container 10 and on the bottom 13 thereof, and adapted to pivotally support one end of a float arm 27, as shown at 28. The other end of the float arm 27 is provided with a sealed float 29, the latter being responsive to the density of the gasoline or liquid within the container 10 for actuating the variable scale 18, the bottom of the latter being connected to the arm 27 at a predetermined point 31 by means of a link 32. A selected spring 33 is provided for biasing the arm 27 in a clockwise direction with respect to the pivot 28. The upper end of the spring 33 may also be connected to the arm 27 at the point 31. The lower end of the spring is connected to the base 26 and is provided with a threaded means 34, whereby the pull of the spring on the arm 27 may be adjusted. The arm 27 is preferably provided with a stop member 35 for limiting the upward and downward movement of the float arm 27.

The variable scale or the pantograph 18 may be provided with suitable means (not shown) such as a spring for supporting the weight of the pantograph, and maintaining the numerous pivoted connections under compression for eliminating any lost motion. However, in the preferred form, as illustrated by the drawing, the density responsive unit 19 is so designed that the buoyancy effect on the pantograph is sufficient to carry the weight of the pantograph and to maintain the same under such compression as will avoid error due to lost motion at the several movable joints.

It is preferable that the float 29 be of such size as to supply sufficient buoyancy effect so that the spring 33 will be maintained under tension at all times when the container 10 is filled with sufficient liquid to rise to a point within the container above the float 29 so that the buoyant effect of the float on the pantograph will equal the buoyancy of the float minus the pull of the spring 33.

It can now be understood that when the container is filled with liquid the buoyancy of the float will equal the weight of the volume of liquid displaced by the float, minus the weight of the float. Therefore, dependent upon the particular liquid to be measured, the float 29 should be of such size that its buoyancy effect, multiplied by the length of the arm 27, will equal the weight of the pantograph plus the tension of the spring 33, multiplied by the distance between the points 28 and 31. The spring 33 can then be adjusted to give a correct spacing of the indicators 20, for a liquid of a given specific gravity at a given temperature. If a liquid is used with a higher specific gravity, the float will have a greater buoyant effect and rise against the control spring 33 and lift the lower end of the pantograph which in turn will decrease the spaces between the indicators 20. If, on the other hand, liquid of a lower specific gravity should be used, the buoyant effect of the float will decrease and the spaces between the indicators 20 will increase to compensate for the change in density of the liquid.

The operation of the device is as follows:

The indicator 20a is adjusted by means of the threaded means 23 to lie in the same plane with the top of the overflow pipe 17. The liquid to be measured is then pumped into the container 10 and the spring adjusting screw 34 set so that the lowermost indicator 20 is correctly placed. The buoyancy of the float 29 and the spring 33 are so selected that the various indicators 20 will take their correct spacings for any variations in liquid density, whereby the liquid will be measured as related to mass instead of volume.

Since the present device is controlled by the density of the liquid, the device will operate correctly whether the density is inherent or due to temperature changes.

While I have illustrated and described but one form of the invention, it will be apparent to those skilled in the art that certain changes, modifications, substitutions, additions and omissions may be made in the device without departing from the spirit and scope of the invention as defined by the appended claims.

I claim:

1. In combination, a liquid container, a variable scale having indicating means in the container at different levels in the container and an actuating unit responsive solely to the density of the liquid for operating said variable scale and proportionately varying the spacings of said indicating means relative to the variations in density of the liquid, said unit including a pivoted actuating arm and a submerged float connected to said arm.

2. In combination, a liquid container, a variable scale having indicating means in the container at different levels in the container and an actuating unit responsive solely to density of the liquid for operating said variable scale and proportionately varying the spacings of said indicating means relative to the variations in the density of the liquid, said unit including an actuating arm turnably supported at one of its ends in said container and having a submerged float associated with the other end of said arm.

3. In combination, a liquid container, a variable scale having indicating means in the container at different levels in the container and an actuating unit responsive solely to density of the liquid for operating said variable scale and proportionately varying the spacings of said indicating means relative to the variations in the density of the liquid, said unit including an actuating arm turnably suported at one of its ends in said container and having a submerged float associated with the other end of said arm, and a resilient means associated with said arm and adapted to oppose the buoyancy effect of said float.

JOSEPH F. PUTNAM.